United States Patent [19]

Briesch et al.

[11] Patent Number: 5,442,908
[45] Date of Patent: Aug. 22, 1995

[54] COMBINED COMBUSTION AND STEAM TURBINE POWER PLANT

[75] Inventors: Michael S. Briesch, Orlando, Fla.; Michael A. Costanzo, Akron, Ohio

[73] Assignees: Westinghouse Elec Corp, Pittsburgh, Pa.; Babcock & Wilcox, New Orleans, La.

[21] Appl. No.: 237,735

[22] Filed: May 4, 1994

Related U.S. Application Data

[63] Continuation of Ser. No. 8,023, Jan. 25, 1993, Pat. No. 5,375,410.

[51] Int. Cl.$^6$ .............................. F02C 6/00
[52] U.S. Cl. ................................ 60/39.182
[58] Field of Search .............. 60/39.182; 122/7 R, 122/7 B

[56] References Cited

U.S. PATENT DOCUMENTS

| | | | |
|---|---|---|---|
| 3,420,054 | 1/1969 | Sheldon | 60/39.182 |
| 3,675,426 | 7/1972 | Vidal et al. | 60/39.182 |
| 3,769,795 | 11/1973 | Rostrom | 122/7 R |
| 3,934,553 | 1/1976 | Freeman, Jr. et al. | 122/7 B |
| 4,136,643 | 1/1977 | Aguet | 122/7 B |
| 4,288,979 | 9/1981 | Liljedahl et al. | 60/39.182 |
| 4,841,722 | 6/1989 | Bjorge | 60/39.182 |
| 4,858,562 | 8/1989 | Arakawa et al. | 122/7 R |
| 4,896,496 | 1/1990 | Zervos | 60/39.182 |
| 5,044,163 | 9/1991 | Bruckner et al. | 60/39.182 |
| 5,140,818 | 8/1992 | Silvestri et al. | 60/678 |

Primary Examiner—Timothy S. Thorpe
Attorney, Agent, or Firm—M. G. Panian

[57] ABSTRACT

A combined combustion and steam turbine power plant which includes a steam turbine unit, a boiler unit for supplying steam to the steam turbine unit, and a combustion turbine unit with an exhaust gas duct structure for supplying the turbine exhaust gases to the boiler unit, has at least one heat recovery steam generator arranged in the exhaust gas flow downstream of the boiler unit and connected to the steam-turbine unit so as to supply any steam generated in the heat recovery steam generator to the steam turbine unit.

6 Claims, 1 Drawing Sheet

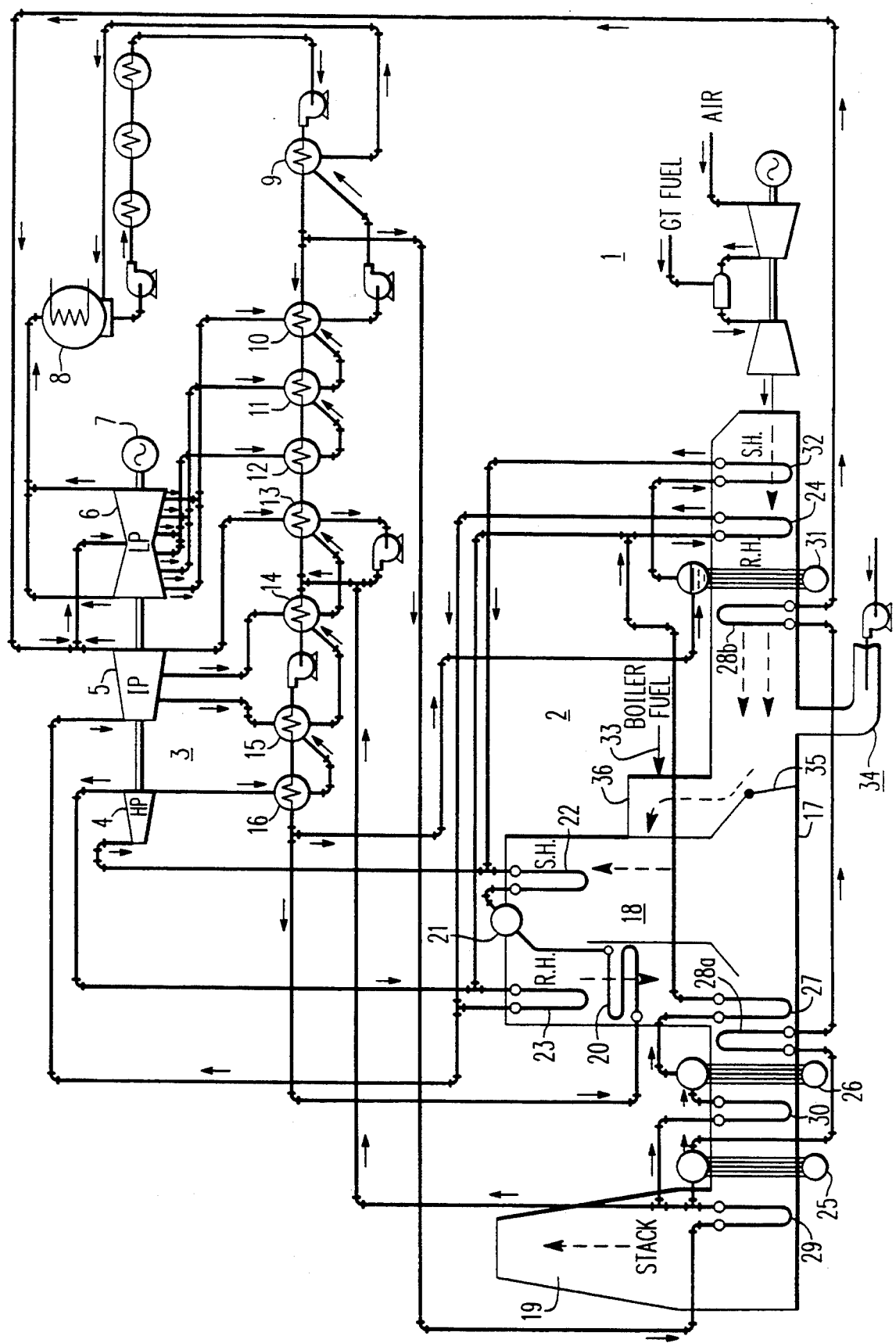

COMBINED COMBUSTION AND STEAM TURBINE POWER PLANT

This is a continuation of application Ser. No. 08/008,023 filed Jan. 25, 1993, now U.S. Pat. No. 5,375,410.

BACKGROUND OF THE INVENTION

The present invention resides in a combined cycle power plant, particularly an integrated steam and combustion turbine power plant with highly efficient Brayton/Rankine cycle arrangement.

The efficiency of conventional steam power plants has been improved by integration of a combustion turbine into conventional steam turbine plants with gas, oil or coal fired boilers which include combustion air preheaters in their exhaust duct to recover as much as possible heat from the boiler exhaust by transferring it to the combustion air for the boiler. However, in a combined cycle plant, combustion air preheaters are not needed since the boilers receive the hot exhaust gases of the associated gas turbines as combustion gases for the boilers.

In order to recover the energy in the boiler exhaust in such combined arrangements, generally, a portion or all of the feedwater of the integrated steam cycle is passed through a stack gas cooler which is installed downstream of the boiler. Often a boiler by-pass is provided by way of which the exhaust gases from the gas turbine can by-pass the boiler when the load on the boiler is relatively low. However, all exhaust gas passes through the stack gas cooler which is located downstream of the juncture where any exhaust gas by-passing the boiler is recombined with the boiler discharge gas. The stack gas cooler is therefore always exposed to the full gas turbine exhaust flow unless the stack gas cooler includes a controllable by-pass flow structure.

It is to be noted that single, large industrial combustion turbines have only a limited capability of adjusting their volumetric flow rate. Thus, the energy available from the stack gas cooler does not vary much over the plant load range. However, the feedwater flow through the stack gas cooler decreases substantially as plant load is reduced. Therefore, even with a slight reduction in plant load the temperature of the feedwater in the stack gas cooler may reach its saturation point so that steaming may occur as the feedwater flows from the stack gas cooler to the boiler. To avoid this undesirable situation, full load feedwater flow through the stack gas cooler is generally maintained at all times and, during part load, when the boiler requires only part of the feed water, the balance is dumped into the condenser. The energy of the feedwater dumped into the condenser is not recovered but is lost which results in reduced operating efficiencies.

It is therefore the principal object of the present invention to provide a combined steam and combustion turbine power plant in which the efficiency does not suffer during part load operation as a result of combustion turbine excess exhaust heat generation.

SUMMARY OF THE INVENTION

In a combined combustion and steam turbine power plant which includes a steam turbine unit, a boiler unit for supplying steam to the steam turbine unit, a combustion turbine unit with an exhaust gas duct structure connected to the boiler unit for supplying the hot turbine exhaust gases thereto, and a stack connected to the boiler unit so as to receive the exhaust gases therefrom for discharge into the atmosphere, at least one heat recovery steam generator is arranged in the exhaust gas flow downstream of the boiler unit and connected to the turbine unit so as to supply any steam generated in the heat recovery steam generator to the turbine unit.

With the arrangement according to the invention, all of the available stack gas energy of power generating plants with integrated combustion turbines and conventionally fired boilers can be removed even during part load operation. Also, any concerns with regard to steaming in stack gas coolers are eliminated.

BRIEF DESCRIPTION OF THE DRAWINGS

The sole FIGURE is a schematic representation of the combined steam and combustion turbine power plant according to the invention.

DESCRIPTION OF THE PREFERRED EMBODIMENT

As shown in the FIGURE, a combined steam and combustion turbine power plant comprises a gas turbine-generator section 1 which is connected to a steam generating section 2 that receives the hot combustion gases from the gas turbine and converts energy contained in the combustion gases into steam. The steam augmented generally by a boiler burning additional fuel is supplied to a steam turbine-generator section 3.

As shown in the FIGURE, the steam turbine-generator section 3 includes a high-pressure turbine 4, an intermediate pressure turbine 5 and a low pressure-turbine 6 all coupled to a generator 7. The steam, after passage through the various turbines, is condensed in a condenser 8 and the condensate is then preheated in stages in feedwater heaters 9, 10, 11, 12, 13, 14, 15 and 16 which receive steam from the various stages of the various turbines. The steam turbine-generator arrangement is essentially as described in U.S. Pat. No. 5,140,818 which is assigned to the assignee of the present invention.

The steam generating section 2 comprises a duct structure 17 which includes various heat exchangers and a boiler 18 and terminates in an exhaust stack 19 through which the exhaust gas from the gas turbine section 1 is finally discharged.

Under full power operation, most of the high pressure steam for operating the high pressure turbine 4 is generated in the boiler 18. The condensate from the steam turbine section 3 is returned to the economizer 20 of the boiler 18. The steam generated in the boiler 18 is collected in the boiler drum 21 and is then supplied to the high pressure turbine 4 via a superheater 22 within the boiler 18. The steam discharged from the high pressure turbine 4 is returned to a reheater 23 which is disposed in the boiler 18, in which the steam is reheated for admission to the intermediate pressure turbine 5. A second reheater 24 is arranged in the duct 17 at the entrance end adjacent the gas turbine section 1 in parallel flow arrangement with the first reheater 23 so as to permit reheating of the high pressure steam by both of the two reheaters 23, 24.

Adjacent the exhaust stack 19, the duct structure 17 includes heat recovery steam generators (HRSG) 25 and 26 for cooling the exhaust gas. As shown in the FIGURE, two HRSG's are utilized so as to be operative at different pressures and temperatures. The higher temperature HRSG 26 is arranged in the duct structure 17 upstream of the lower temperature HRSG 25 and supplies the steam generated therein via a steam superheater 27 and the reheater 24 as drive steam to the intermediate pressure turbine 5. The lower temperature HRSG 25 supplies the steam generated therein via steam heater 28a arranged in the duct structure 17 upstream of the HRSG 26 and a steam heater 28b arranged upstream of the boiler 18 to the low pressure steam turbine 6. Both HRSGs 25, 26 are supplied with condensate from condenser 8 via a final heat exchanger 29 from which the condensate flows either directly to the lower temperature HRSG 25 or via another heat exchanger 30 arranged just downstream of the higher temperature HRSG 26 to the HRSG 26. Additional condensate can be circulated through economizer 29 and delivered back to the feedwater heater system as indicated in FIG. 1 to thereby further improve cycle performance.

The HRSGs 25 and 26 are capable of recovering any available amount of heat from the exhaust gas before it is discharged through the stack 19. They are each operated at essentially constant temperature and maintain an essentially constant exhaust gas temperature as the steam generated therein is utilized in the steam turbines.

As shown in the FIGURE, there are preferably provided two HRSGs, the second HRSG 25 being arranged in the combustion gas duct just downstream of the HRSG 26 and operated at a lower temperature so as to further cool the combustion gas leaving the first HRSG 26.

Ahead of the boiler 18, the duct structure 17 may include a turbine exhaust gas cooler in the form of another HRSG 31 in order to reduce the exhaust gas temperature to a temperature more easily accommodated by conventional boiler structures. Its feedwater and steam system are arranged essentially in parallel with the boiler 18 and connected so as to receive its feedwater from the highest temperature feedwater heater 16 and to supply its steam to the high pressure turbine 4 via a superheater 32 arranged in the duct structure 17 adjacent the combustion turbine unit 1.

Depending on the steam load required, the temperature of the exhaust gas from the combustion turbine 1 will be increased as it enters the boiler 18 by combustion of boiler fuel 33 supplied thereto. Also, additional fresh air may be supplied to the duct 17 for combustion of the fuel, via fresh air supply means 34. Under certain load conditions, the boiler structure can be by-passed by the turbine exhaust gas by appropriate positioning of a damper 35 which is arranged in the duct structure pivotally so as to direct the turbine exhaust gas either through a windbox 36 to the boiler 18 or to by-pass the boiler.

The steam flow to and the water flow from the steam turbine and the boiler as suggested herein is by way of piping arranged externally of either of those components so that the addition of a HRSG(s) to a conventional plant does not change the configuration or the thermal cycle of a conventional plant.

The configuration according to the invention provides not only for improved efficiency at full load operation but for even greater efficiency during part-load operation where, for plant load reduction, full load may be maintained for the combustion turbine while fuel combustion in the boiler may be reduced. In fact, efficiency continues to improve until combustion of fuel in the boiler is terminated at which point operation of the plant corresponds to the operation of a normal combined cycle power plant. Further load reduction is obtained by part-loading the combustion turbine. Over the entire range of part load operation however the arrangement according to the present invention provides for maximum cycle efficiency as the heat available from the exhaust gas can always be recovered by the HRSGs and utilized in power generation. No dumping of feedwater flow into the condenser to avoid steaming in a stack gas cooler is necessary.

We claim:

1. A combined cycle power plant, comprising:
   a steam turbine;
   a boiler unit for generating and supplying a first source of steam to said steam turbine unit;
   a combustion turbine unit with an exhaust gas duct structure for supplying the combustion turbine exhaust gases to said boiler unit and an exhaust gas stack for discharging the exhaust gases into the atmosphere, said duct structure including at least one heat recovery steam generator disposed in the flow of exhaust gas discharged through said exhaust gas stack, said heat recovery steam generator being connected to said steam turbine unit for generating and supplying a second source of steam to said steam turbine unit;
   a boiler fuel supply; and
   means for combusting said boiler fuel supply for increasing the boiler temperature independent of the temperature of the exhaust gases from said combustion turbine.

2. A power plant according to claim 1, wherein said steam turbine unit comprises a high pressure, an intermediate pressure and a low pressure turbine and said heat recovery steam generator is connected to said intermediate pressure turbine.

3. A power plant according to claim 2, wherein said heat recovery steam generator is connected to said intermediate pressure turbine via a steam superheater arranged in the flow of said combustion gas upstream of said heat recovery steam generator.

4. A power plant according to claim 3, wherein another heat recovery steam generator is disposed in the flow of exhaust gas downstream of said one heat recovery steam generator and is operated at a temperature and pressure lower than said one heat recovery steam generator, the other heat recovery steam generator being connected to said low pressure turbine for delivering its steam to said low pressure turbine.

5. A power plant according to claim 4, wherein said other heat recovery steam generator is connected to said low pressure turbine via at least one superheater arranged in said exhaust gas flow upstream of said one heat recovery steam generator.

6. The power plant according to claim 1, wherein said duct structure further comprises a damper for controlling the interaction of the exhaust gases from said combustion turbine with said boiler.

* * * * *